Nov. 1, 1927.
H. B. MAY
LUBRICATING DEVICE
Filed Dec. 3, 1926
1,647,924
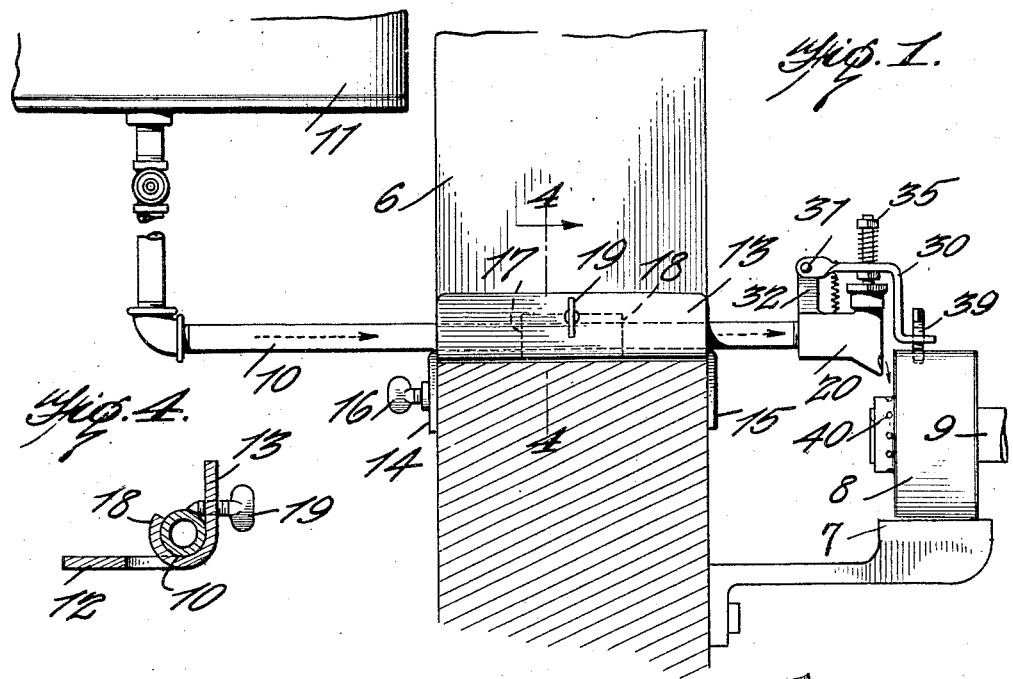
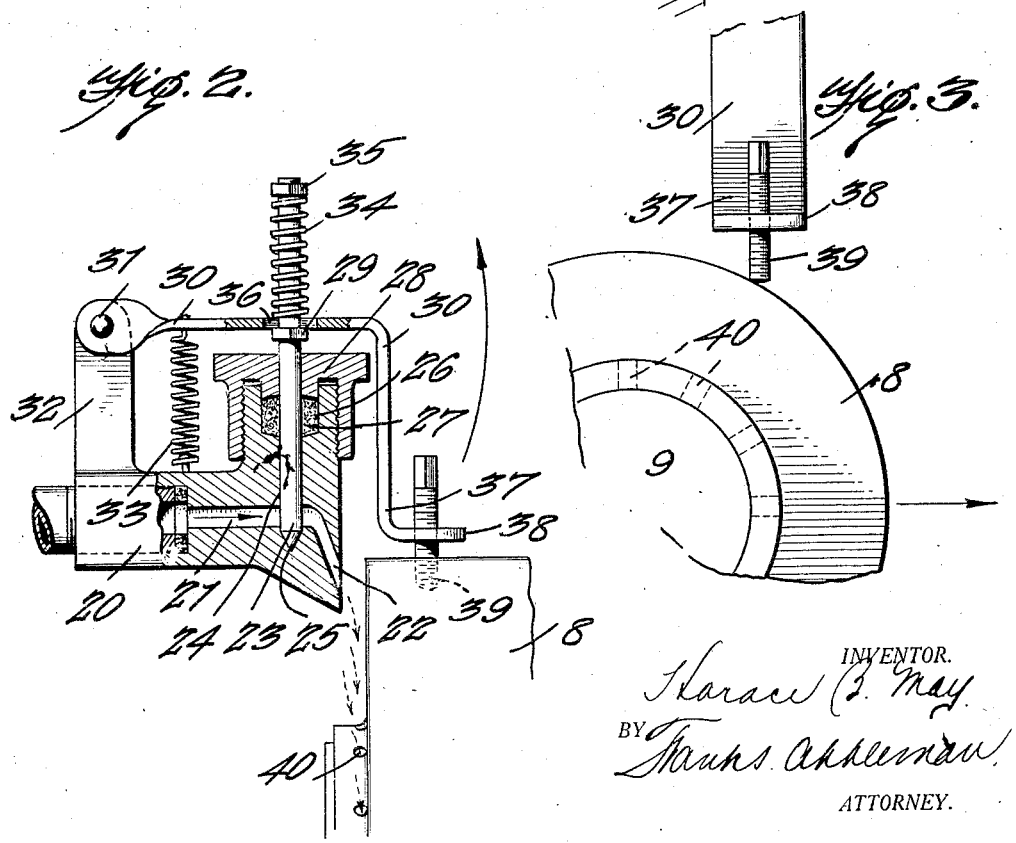
INVENTOR.
Horace B. May.
BY Franks Ackerman
ATTORNEY.

Patented Nov. 1, 1927.

1,647,924

UNITED STATES PATENT OFFICE.

HORACE B. MAY, OF WASHINGTON, DISTRICT OF COLUMBIA.

LUBRICATING DEVICE.

Application filed December 3, 1926. Serial No. 152,413.

This invention relates to lubricating devices for conveyers of ovens or the like, and it has for an object the provision of novel means for furnishing lubricant to conveyers utilized in baking ovens where the heat is relatively great and where efficient lubrication is maintained with difficulty.

It is a further object of this invention to provide novel means whereby the bearings of traveling conveyers may be lubricated each time a bearing passes the location of the lubricator, or periodically, according to the requirements of the particular apparatus.

It is well known that conveyers of baking ovens operate on rails and that wheels which rotate on axles or shafts travel on the rails, the shafts constituting supports for trays which carry the product to be baked.

It is a still further object of this invention to provide means preferably tripped or actuated by the rollers or a part of the conveyer which will result in lubricating the bearings of the wheels, and to that end, a novel device is associated and preferably located stationary with respect to the aforesaid wheels, means being provided whereby, when the bearing of the wheel is in certain position with respect to the lubricator, lubricant will be released and deposited on the side of the wheel where it will by gravity find its way to the bearing; and provision is made whereby the lubricator will be tripped and will release lubricant during the passage of each succeeding roller.

It is furthermore an object of this invention to produce a lubricator associated with novel means for installing it in ovens now in general use or in new equipment; and it is a still further object to produce means by which the aforesaid results may be expeditiously accomplished.

While reference has been made to the invention as being applicable to baking ovens, it is to be understood that the invention can be used with the same degree of efficiency in connection with conveyers having rollers or so-called "roller conveyers", regardless of their location, and the inventor contemplates the use of the invention in connection with annealing and other ovens, or, in fact, in connection with a chain of roller conveyers which generally operate in a heated chamber.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a sectional view of a fragment of an oven with a shaft and roller in elevation, and a device embodying the invention applied thereto;

Figure 2 illustrates an enlarged sectional view of the oil distributor;

Figure 3 illustrates a view in side elevation of the conveyer roller and the oiler trip in operative relation thereto; and Figure 4 illustrates a sectional view of the bracket for holding the pipe.

In the embodiment of the invention illustrated, the furnace wall 5 has the usual side opening 6 which, of course, is controlled by a door, but as these are well known features of ovens, further description thereof is believed unnecessary. In bakers' and other ovens having conveyers, many types include structures in which rails 7 are stationarily secured in the oven, and these rails support wheels or rollers 8, which rollers travel on the rails and are associated with shafts 9 on which the rollers rotate. The bearing or shaft 9 must be lubricated frequently with a lubricant that is highly resistant to heat, since in baking ovens the temperature is approximately 400 degrees F., although it may vary slightly from this temperature. On account of this heat, efficient lubrication is desirable to prevent undue wear of the shaft or the bearing of the wheel, and it is a part of the invention to produce novel means whereby these bearings are lubricated as they pass a lubricant distributor. To accomplish the foregoing result, the present invention includes a means for adjustably holding a lubricant supply pipe 10 in position to deliver lubricant to a distributor and the pipe 10 is preferably connected to a lubricant tank or reservoir 11 supported by the said pipe in an elevated position in order that the lubricant will feed by gravity.

The pipe is secured in the opening of the oven by a bracket which, in the present embodiment, consists of a plate 12 having an upstanding flange 13 at its edge and integral arms 14 and 15 at its ends, which arms extend downwardly and with the plate they embrace a portion of the wall of the oven at the opening. The arm 14 is provided with a set screw 16 which is threaded in the said arm and it is intended to bear against the wall of the oven so that the arms and the screw act as a clamp for retaining the bracket in place. The base plate 12 near its central zone is cut transversely along two lines 17 and 18, and the portion of the base plate between the said lines 17 and 18 is bent or curved upwardly and inwardly and this portion embraces the pipe 10 and holds it between the said portion and the flange 13.

As a means for frictionally retaining the pipe in different positions of adjustment, a screw 19 is threaded through the flange 13 and it bears against the pipe 10 so that by tightening the screw against the pipe, it will be held in a set position. By means of this mounting for the pipe and lubricator, the lubricator may be adjusted to bring it into exact operative position with relation to the conveyer wheels, and the lubricator may be changed from one side of the apparatus to another so that both sides of the conveyer or both ends of the shaft containing the rollers may be lubricated.

The lubricant distributor consists, in the present embodiment of the invention, of a valve comprising a shell or case 20 which is secured on the inner end of the pipe 10, and the said valve has a port or duct 21 communicating with the said pipe 10, and the said duct 21 merges into a diagonally downwardly extending discharge orifice 22 which extends to the exterior of the valve shell or case at the side edge thereof, as fully shown in Fig. 2.

A needle or other type of valve 23 reciprocates in an aperture 24 and intersects the port 21 and coacts with a valve seat 25 in the lower wall of the duct or port. The aperture 24 merges with a stuffing box 26 of the valve shell or body and the stuffing box is intended to contain a packing 27 of heat resisting material, such as asbestos, which is, of course, compressed in the stuffing box by the cap and gland 28 which may be of usual construction. The valve stem reciprocates through the stuffing box and cap and projects a suitable distance thereabove. A shoulder 29 on the valve is engaged by a lever 30 that is pivoted as at 31 on a post 32 rigid with the valve shell.

A spring 33 is connected to the lever and is anchored to the shell and its function is to exert a pull on the lever to hold it normally downward, as will presently appear.

A spring 34 encircles the valve stem above the lever and it abuts the said lever on its upper surface. The spring is held under tension on the valve stem by a nut 35 which is adjustable for increasing or diminishing the tension of the spring. The lever has a slot 36 through which the valve stem projects and the lever may therefore oscillate freely without imparting any lateral pressure on the valve stem, although it will raise the valve stem through the pressure exerted on the spring 34 when the lever is raised. The lever shown is angularly disposed and has a downwardly extending portion 37 terminating in an angularly disposed foot 38 in which a tripping abutment 39 is adjustable through the means of threads, as in the present showing. The abutment is intended to be located in the path of travel of the wheels or rollers on the shafts 9 of the conveyer in order that when the said wheels come in contact with the abutment at its lower end, it will ride over the peripheries of the rollers and cause the elevation of the lever and hence the elevation of the valve. When the valve is elevated, lubricant will be discharged and delivered to the outer side or surface of the roller or wheel and it will by gravity find its way into the apertures 40 provided for the admission of lubricant in structures of this type. In those constructions where the hub of the roller or wheel is not provided with apertures for the lubricant, the lubricant will flow onto the shaft and will find its way to the bearing of the roller.

If the abutment is adjusted vertically, it can be made to increase or diminish the throw of the lever and consequently the throw of the valve, and by this means, the discharge of lubricant may be controlled, that is to say, it may be increased or diminished, according to the said adjustment.

As the operation of the several parts of the apparatus has been stated in connection with a description of the elements, those skilled in the art will, it is thought, understand the purposes and functions of it.

From the foregoing, it will be seen that I have made a cheap, simple and effective device for applying lubricant to the journals of supporting wheels for conveyer chains and that the construction is such that the invention is readily applicable to a wall of bakers' ovens, and when applied thereto, the container for the lubricant will be outside of the oven and is adjustably connected by means of an appropriate fixture which engages the wall of the oven so that the valve casing may be positioned inward or outward relative to the supporting track and roller to be lubricated.

I claim:

1. In a roller conveyer lubricator, a supply pipe adapted to be secured for the delivery of lubricant, a valve shell having a port communicating with the pipe, the said valve having a discharge orifice at the side thereof, a valve operating in the shell for controlling the passage of lubricant through the port, a lever oscillatably mounted in operative relation to the shell and operative to actuate the stem of the valve, means whereby the movement of the lever is imparted to the valve, an abutment on the lever located to be in the path of travel of a roller of a conveyer to lift the discharge valve.

2. In a roller conveyer lubricator, a lubricant supply pipe, wall engaging means for securing the pipe in operative relation to the rollers of the conveyer, a valve casing on the pipe, an orifice through which lubricant is discharged from the pipe to the upper side of a conveyer roller, and means operated by the rollers of the conveyer for controlling the valve to effect release of lubricant when the rollers of the conveyer are in position to receive the lubricant.

3. In a roller conveyer lubricator, a pipe which communicates with the receptacle for lubricant, a valve casing attached to the pipe, the same having a discharge orifice, a valve, a trip for the valve operative to release lubricant adapted to be actuated by contact with the upper surface of the conveyer rollers, and means for communicating the motion of the trip of the valve, and spring actuated means for restoring the valve to closed position when the trip is out of contact with a roller of the conveyer.

4. In a roller conveyer lubricator, a valve comprising a valve casing having a lubricant passage therethrough and discharging at the side of the valve casing, a valve stem mounted for reciprocation in the valve casing and operative to control the passage for the lubricant, a stuffing box through which the valve stem operates, a post on the valve casing, a lever pivotally mounted on the post extending parallel with the discharge opening of the valve in spaced relation to the valve, means for pulling the lever normally toward the valve casing, the said lever having a slot through which the valve stem projects, a spring encircling the valve stem beyond the lever for communicating motion of the lever to the valve stem, means for holding the spring under tension, an abutment threaded in an extension of the lever and located in the path of travel of rollers of a conveyer, the said abutment being adapted to communicate motion to the lever for elevating it and discharging lubricant to the bearing of the roller as the roller actuates the lever.

5. The combination in means for lubricating wheels of chains, of a fixed track, a chain having wheels arranged to travel on the track, each wheel having a hub with a plurality of lubricating openings therethrough, of means for applying lubricant to a face of a wheel and from thence to openings to lubricate the bearings of said wheels, a valve casing attached to an oil supply and maintained within an oven and above the shafts of the rollers to be lubricated, said valve casing having a lubricant discharge orifice located above the hub, a valve which intercepts the oil passage beyond the discharge end of the orifice, a collar and a spring carried by the valve, a post which extends upward from the valve casing to which valve operating means is maintained in oscillatory engagement.

HORACE B. MAY.